(12) United States Patent
Chadwick et al.

(10) Patent No.: US 11,806,886 B2
(45) Date of Patent: *Nov. 7, 2023

(54) RAZOR BLADES

(71) Applicant: The Gillette Company LLC, Boston, MA (US)

(72) Inventors: John Chadwick, Pelham, NH (US); Neville Sonnenberg, Newton, MA (US)

(73) Assignee: The Gillette Company LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,282

(22) Filed: Jul. 17, 2020

(65) Prior Publication Data

US 2020/0391398 A1 Dec. 17, 2020

Related U.S. Application Data

(63) Continuation of application No. 16/928,502, filed on Jul. 14, 2020, which is a continuation of application No. 15/431,553, filed on Feb. 13, 2017, now Pat. No. 10,766,157.

(51) Int. Cl.
*B05D 3/10* (2006.01)
*B05D 5/00* (2006.01)
*B26B 21/60* (2006.01)
*B26B 21/40* (2006.01)
*C08J 7/02* (2006.01)
*B05D 5/08* (2006.01)

(52) U.S. Cl.
CPC .......... *B26B 21/60* (2013.01); *B26B 21/4068* (2013.01); *C08J 7/02* (2013.01); *B05D 3/107* (2013.01); *B05D 5/083* (2013.01); *B05D 2202/15* (2013.01); *B05D 2506/15* (2013.01)

(58) Field of Classification Search
CPC ........ B26B 21/60; B26B 21/4068; C08J 7/02; B05D 2506/15; B05D 2202/15; B05D 5/083; B05D 3/107

See application file for complete search history.

(56) References Cited

U.S. PATENT DOCUMENTS

| 3,071,856 | A | | 1/1963 | Fischbein |
| 3,608,473 | A | * | 9/1971 | Kearn ..................... A47J 27/18 99/410 |
| 3,949,067 | A | | 4/1976 | Gibbs |
| 4,820,884 | A | | 4/1989 | Weigert |
| 5,384,345 | A | | 1/1995 | Naton |

(Continued)

FOREIGN PATENT DOCUMENTS

| CN | 1910018 A | 2/2007 |
| EP | 1704026 A1 | 9/2006 |

(Continued)

OTHER PUBLICATIONS https://www.chemicalbook.com/ChemicalProductProperty_EN_CB2752208.htm (Year: 2017).*

(Continued)

*Primary Examiner* — Alexander M Weddle
(74) *Attorney, Agent, or Firm* — Kevin C. Johnson; Joanne N. Pappas

(57) ABSTRACT

The invention discloses a novel solution and process comprising a modified solvent for providing enhanced blade edge attributes.

20 Claims, 8 Drawing Sheets

(56) References Cited

U.S. PATENT DOCUMENTS

| | | | |
|---|---|---|---|
| 5,477,756 | A | 12/1995 | Trankiem et al. |
| 5,985,459 | A * | 11/1999 | Kwiecien ............... B26B 21/60 428/421 |
| 7,060,367 | B2 | 6/2006 | Yamada et al. |
| 10,011,030 | B1 * | 7/2018 | Slattery ................... B05D 1/18 |
| 10,766,157 | B2 | 9/2020 | Chadwick et al. |
| 10,821,619 | B2 | 11/2020 | Madeira et al. |
| 2002/0043334 | A1 | 4/2002 | Johnson |
| 2002/0161014 | A1 | 10/2002 | Sadhu et al. |
| 2005/0155460 | A1 * | 7/2005 | Trankiem ............... B05D 3/107 76/104.1 |
| 2007/0044248 | A1 | 3/2007 | Bratescu et al. |
| 2007/0062047 | A1 | 3/2007 | Zhuk |
| 2007/0227009 | A1 | 10/2007 | Zhuk et al. |
| 2009/0139547 | A1 * | 6/2009 | Park .................... A47L 15/0031 134/25.2 |
| 2014/0101945 | A1 | 4/2014 | Wang et al. |
| 2016/0001456 | A1 | 1/2016 | Duff, Jr. et al. |
| 2016/0096281 | A1 | 4/2016 | Hejmowski et al. |
| 2016/0096282 | A1 | 4/2016 | Doyle et al. |
| 2016/0239727 | A1 | 8/2016 | Trissel et al. |
| 2018/0230320 | A1 | 8/2018 | Chadwick et al. |
| 2020/0338771 | A1 | 10/2020 | Chadwick et al. |
| 2020/0353504 | A1 | 11/2020 | Yu et al. |
| 2021/0252727 | A1 | 8/2021 | Pandis et al. |

FOREIGN PATENT DOCUMENTS

| | | |
|---|---|---|
| EP | 3616800 A1 | 3/2020 |
| GB | 1230567 A | 5/1971 |
| WO | 2010081119 A1 | 7/2010 |

OTHER PUBLICATIONS

Parr Instrument Company. "Series 4560 Mini Reactors, 100-600 mL." <<https://www.parrinst.com/products/stirred-reactors/series-4560-100-600-ml-mini-reactors/>>, Nov. 28, 2011, last viewed Oct. 8, 2021. (Year: 2011).*
All Office Actions, U.S. Appl. No. 15/431,553.
All Office Actions, U.S. Appl. No. 15/431,566.
All Office Actions, U.S. Appl. No. 16/928,502.
All Office Actions, U.S. Appl. No. 16/407,715.
International Search Report and Written Opinion; Application Ser. No. PCT/US2018/016980; dated May 14, 2018, 14 pages.
All Office Actions; U.S. Appl. No. 17/832,992, filed Jun. 6, 2022.
Unpublished U.S. Appl. No. 17/832,992, filed Jun. 6, 2022, to John Chadwick, et al.

* cited by examiner

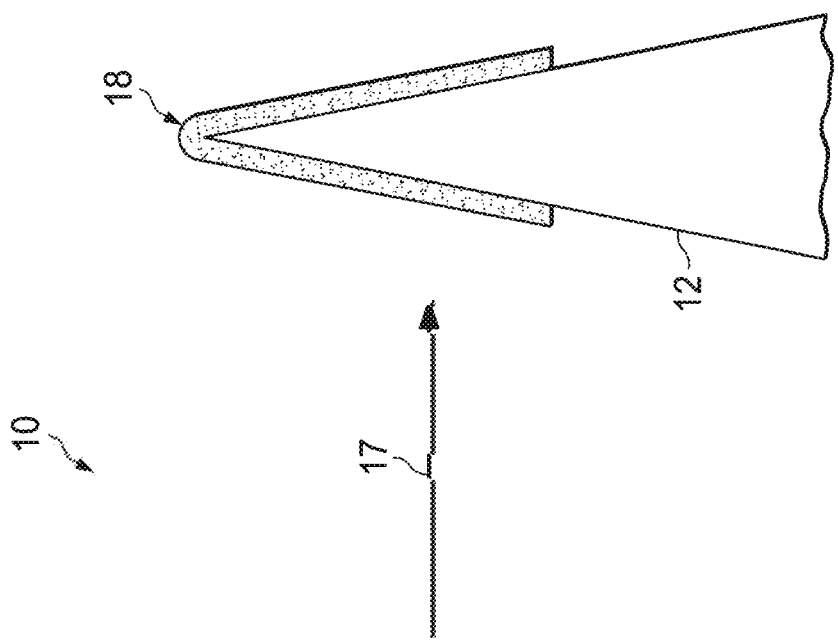
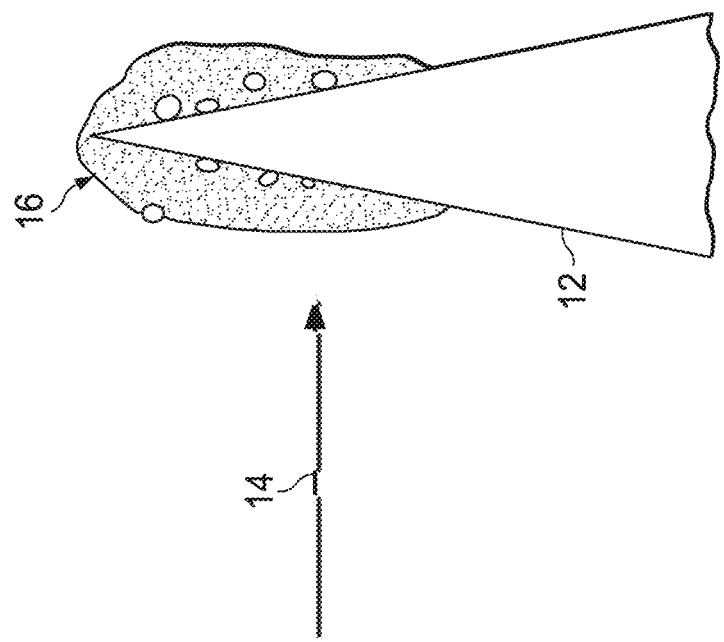
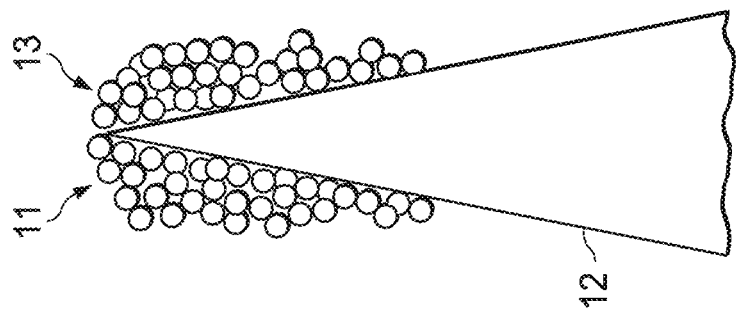
FIG. 1
PRIOR ART

RAZOR BLADES

FIELD OF THE INVENTION

This invention relates to razor blades, and more particularly to coatings on razor blade cutting edges and manufacture thereof.

BACKGROUND OF THE INVENTION

It is generally known in the prior art that a wet razor assembled with fluoropolymer coated blades outperforms a razor assembled without fluoropolymer-coated blades. One of the most common fluoropolymers utilized for coating razor blades is polytetrafluoroethylene or PTFE (or a form of TEFLON®). The addition of PTFE (e.g., telomer) coating to the blade cutting edge dramatically reduces the cutting force values for beard hairs or other types of hair fibers. A reduced cutting force is desirable as it significantly improves shaving attributes including safety, closeness and comfort. Such known PTFE-coated blade edges are described in U.S. Pat. No. 3,071,856.

There are many types of coating processes that could be utilized to produce polymer coated (e.g., PTFE) coated blade edges. Some processes involve aqueous dispersion of the PTFE and some involve organic dispersion of the PTFE. Aqueous dispersion processes may include spraying, spin coating and dipping. PTFE may also be deposited on blade edges using vacuum based processes such as sputtering or thermal Chemical Vapor Deposition (CVD). However, when quality, cost and environmental issues are considered, the spraying of an aqueous PTFE dispersion is typically desired. PTFE dispersion in an organic solvent is also a known process in the art. This type of dispersion may include for example, Dupont's Vydax 100 in isopropanol as described in U.S. Pat. No. 5,477,756.

Regardless of whether an aqueous or organic based dispersion is utilized, if a spraying process is utilized along with a subsequent sintering process, a non-uniform surface morphology, on a microscopic scale, is generally produced on blade edges and in the area proximal to the ultimate blade tips which is a drawback.

There is a need for an improved, effective method and apparatus to produce desirable blade edges with improved shaving attributes.

SUMMARY OF THE INVENTION

The present invention is directed to a method of treating one or more polyfluorocarbon coated razor blades comprising the steps of contacting at least one polyfluorocarbon coated razor blade with a solution of $C_{14}F_{24}$ comprising one or more defluorination compounds. The one or more compounds comprise $C_{14}F_n$ where n=10 to 23. The one or more compounds comprise one or more of the following compounds: $C_{14}F_{10}$, $C_{14}F_{14}$, or $C_{14}F_{18}$ or any combination thereof. The solution comprises perfluoroperhydrophenanthrene.

In one aspect, a concentration of any one of the compounds in the solution is less than or equal to about one part per million. The concentration of the $C_{14}F_{18}$ compound in the solvent is about 0.05% to about 1.0%, the concentration of the $C_{14}F_{14}$ compound in the solvent is about 0.05% to about 1.0%, and the concentration of the $C_{14}F_{10}$ compound in the solvent is about 0.05% to about 1.0%. The concentration of the one or more $C_{14}F_n$ compounds ranges from about 0.05% to about 3%.

In another aspect, the step of contacting is repeated up to about 100 times. The contacting step is applied for a time ranging from about 30 seconds to about 1 hour. The contacting step is at a temperature range of about 500° F. to about 700° F. The contacting step is applied to the coating after the polyfluorocarbon coating has been sprayed, sintered or any combination thereof.

In yet another aspect, the method further comprises the step of removing, none of, portions of, or all of the contacted coated blade edges from the solution of $C_{14}F_{24}$ comprising one or more defluorination compounds. Still further, the method comprises the step of providing uncontacted coated razor blade edges in the solution of $C_{14}F_{24}$ comprising one or more defluorination compounds.

In another aspect of the invention, the contact step further comprises placing the blades in a vessel, sealing the vessel, placing the solution in the vessel, heating the vessel, removing the solvent, and cooling the blades. The contacting step partially removes the coating of the coated razor blades.

In a further aspect, the solution of $C_{14}F_{24}$ comprising one or more defluorination compounds further comprises PTFE. The solution of $C_{14}F_{24}$ comprising one or more defluorination compounds further comprises iron, carbon-based steel, stainless-steel, or particles, surfaces or compounds thereof. The solution further has a yellow color.

In a further aspect, the present invention is directed to a solution for treating one or more coated razor blades the solution comprising a yellow color.

In another aspect, the present invention relates to a method of treating one or more polyfluorocarbon coated razor blades comprising contacting at least one polyfluorocarbon coated razor blade with a solution comprising one or more defluorination compounds. The solution is $C_{14}F_{24}$. The one or more defluorination compounds comprise $C_{14}F_n$ wherein n=10 to 23.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings.

FIG. 1 is a flow diagram depicting a thinning process using FLUTEC® technology.

FIG. 2A is a close up view of aspects of FIG. 2.

DETAILED DESCRIPTION OF THE INVENTION

Figure 2:
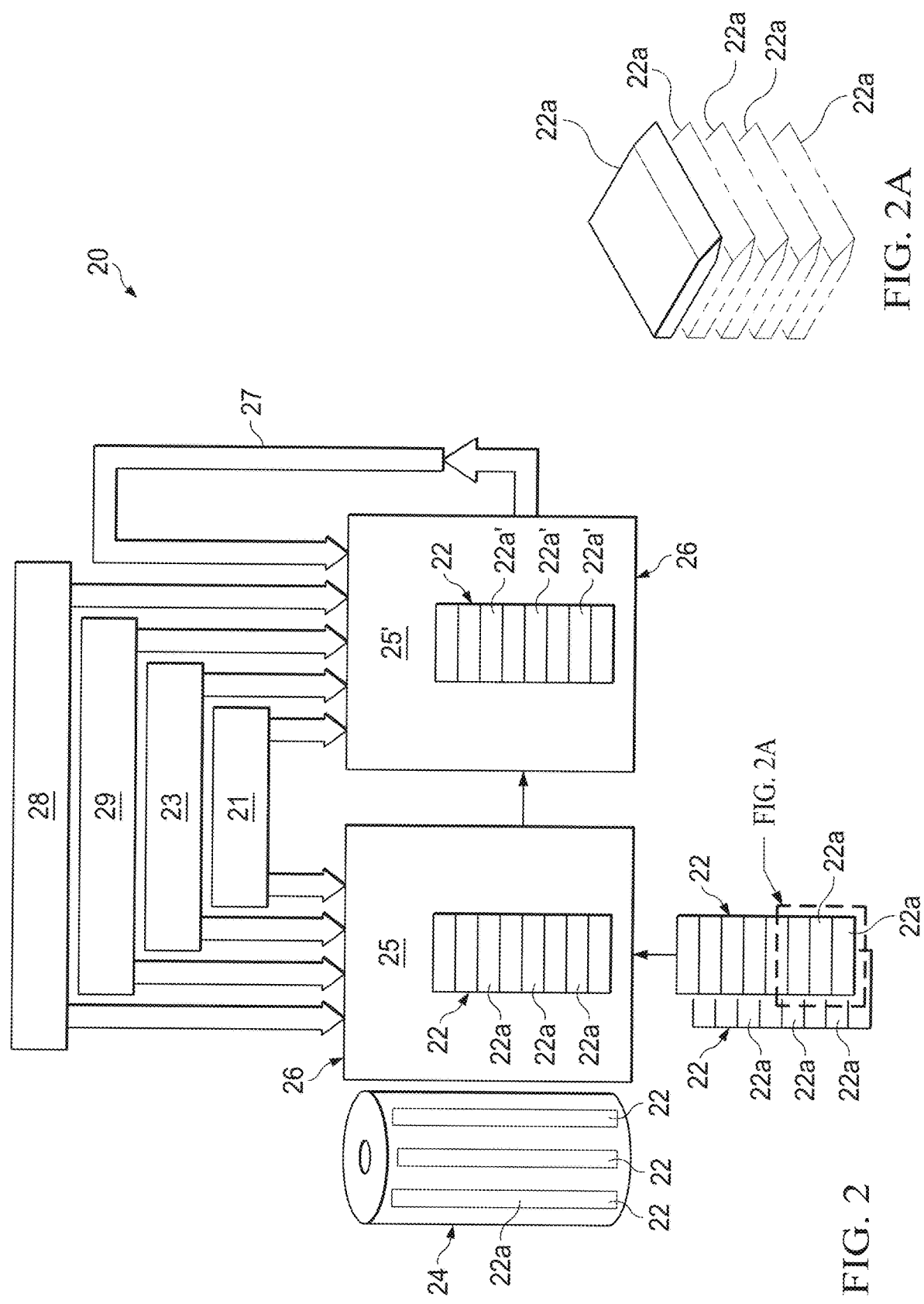
FIG. 2 is a schematic of a process in accordance with the present invention.

The present invention provides a novel solvent and process to provide improved blade edges.

The present invention relates to razor blade cutting edges which are formed such that they exhibit an improvement in shaving attributes. One principal aspect of the invention is directed towards producing a novel solvent having formed a thin coating on the blade edge with a low cutting force and low friction. The term "thin" refers to the thickness of the coating on a razor blade edge of the present invention. Generally, the thinner the coating becomes on blade edges, the lower the cutting force and the better the shaving attributes. A commonly utilized material for blade edge coating is a type of fluoropolymer, namely polytetratfluoroethylene, or PTFE. As such, PTFE will be referenced throughout the description of the instant invention but not to the exclusion of any other materials which may be substituted substantially equivalently.

Too thin PTFE coatings on blade edges can give rise to poor coverage and low wear resistance due to intrinsic properties of the polymer (e.g., PTFE) material. Alternatively, a too thick PTFE coating may produce very high initial cutting force values, which generally may lead to more drag, pull, and tug, eventually losing cutting efficiency and subsequently shaving comfort.

One approach has been the application of LUTEC® technology as described in U.S. Pat. No. 5,985,459, assigned to the Assignee hereof and herein incorporated by reference in its entirety, which is capable of reducing the thickness (e.g., or thinning) a relatively thick PTFE coating produced by a spray and sintering process. This process, as shown in FIG. 1 depicts a flow 10 where blade 12 which has sprayed PTFE particles 11 coated on and around its tip 13 is sintered as shown at step 14 with Argon at about 1 atmospheric pressure (1 atm) and at a temperature of about 330 degrees Celsius (° C.) to about 370° C. to produce a sintered PTFE coating 16. The FLUTEC® technology as shown at step 17 is subsequently placed on coating 16 to produce a thinned PTFE coating 18. This typically includes soaking the PTFE coated blades 16 in a solvent under elevated temperatures of about 270° C. to about 370° C. and at a pressure of about 3 atm to about 6 atm. The solvent employed in the FLUTEC® process may include perfluoroalkanes, perfluorocycloalkanes, or perfluoropolyethers.

The present invention overcomes the technical challenge of balancing the attributes of the polymer material with obtaining the most desirable thin coating possible to provide improved shaving attributes. In a particular embodiment, the present invention provides improved FLUTEC® technology processes and an improved FLUTEC® solvent. As noted for instance in U.S. Pat. No. 5,985,459, blades are immersed in a Flutec oligomer, such as Flutec PP11, or perfluoroperhydrophenanthrene for a couple minutes or more and heated under pressure. This solution treats the blades by partially removing the coating on the blades. Specifically, the coating that is removed is generally the outer coating, typically the soft, lubricious coating (e.g., a polymeric material, such as PTFE) which was previously sprayed on or may be sprayed and sintered, if desired.

The present invention however recognizes that the initial use of the FLUTEC® solvent (or equivalent) is generally not entirely effective at improving the blade edge attributes desired, such as wool felt cut force values. It was surprisingly found that, in some instances, the initial use of the Flutec had a negative impact when wool felt cut force test values were obtained on the blade edge.

The present invention blades are processed or "run" through the same, already-utilized FLUTEC® solvent solution, one or several times, sometimes on the order of 50, 80 or 100 times (or in a range from about 1 to about 100 "runs"). This novel process unexpectedly achieved an improved wool felt cut force on the blade edges. Furthermore, it was only after several, sometimes on the order of 50, 80 or 100 "runs" (or in a range of about 1 to about 100 "runs"), of the blades through the same, already-utilized FLUTEC® solvent, that the desirable wool felt cut force values obtained were maintained (e.g., stable) or replicated in subsequent runs.

Thus, in accordance with a preferred embodiment of the present invention, a "processed" or modified FLUTEC® solvent is provided which is very effective at providing enhanced blade edge attributes, such as wool felt cut force values. It was also startling that the modified FLUTEC® solvent had one or more compounds which were recognized as providing the added benefit to the solution. These compounds of the present invention which will be described herein will be referred to as defluorination compounds and are in concentrations of less than 1 parts per million. In addition to these compounds, portions or particles of the removed blade edge coating, and in particular the Teflon or PTFE coating and iron, carbon-based steel, stainless-steel, or particles, surfaces or compounds thereof may also be present in the novel solvent.

The present invention contemplates a doping of, or adding to, a FLUTEC® solvent (original or modified), with original FLUTEC® solvent, one or more defluorination compounds, Teflon or PTFE, and/or iron, carbon-based steel, stainless-steel, or particles, surfaces or compounds.

All percentages and ratios described herein are on a weight basis unless otherwise indicated.

As used herein, the term "razor blade edge" or "razor blade cutting edge" or "blade edge" includes the cutting point and facets of the blade.

As used herein, a "solution" is a homogeneous mixture signifying that components are mixed together. A "solution" is made up of a solute, which is the substance being dissolved. A "solvent" is the substance in the largest amount into which the solute is dissolved. The solution of the present invention preferably comprises a Flutec solvent or a modified Flutec solvent comprising other compounds, components, solutes, or combination thereof. A solute of the present invention preferably comprises one or more defluorination compounds, PTFE, or iron, carbon-based steel, stainless-steel, or particles, surfaces or compounds thereof. The ideal modified Flutec solution of the present invention is a type of solvent-solution and as such the term solvent and solution may be used interchangeably herein.

As used herein, a "compound" is defined as an impurity, a dopant, a reaction byproduct, a breakdown product or any combination thereof.

In the present invention, blade attributes can be measured using various tests. Measuring cutting force correlates with sharpness of blades. The blade sharpness of the treated blades may be quantified by testing the blades for cutting force. Cutting force is determined by the wool felt cutter test, which measures the cutting force values of the blade by measuring the force required by each blade to cut through wool felt. Each blade is run through a wool felt cutter 5 times and the force of each cut (e.g., in pounds) is measured on a recorder. The lowest of 5 cuts is defined as the cutting force. In the present invention, wool felt cutter tests are preferably performed on the blades or a sample of the blades after each treatment or run. Other tests such as silicon oil drop tests and microscopy elevation evaluations are also contemplated in the present invention for determining blade attributes.

Figure 3:
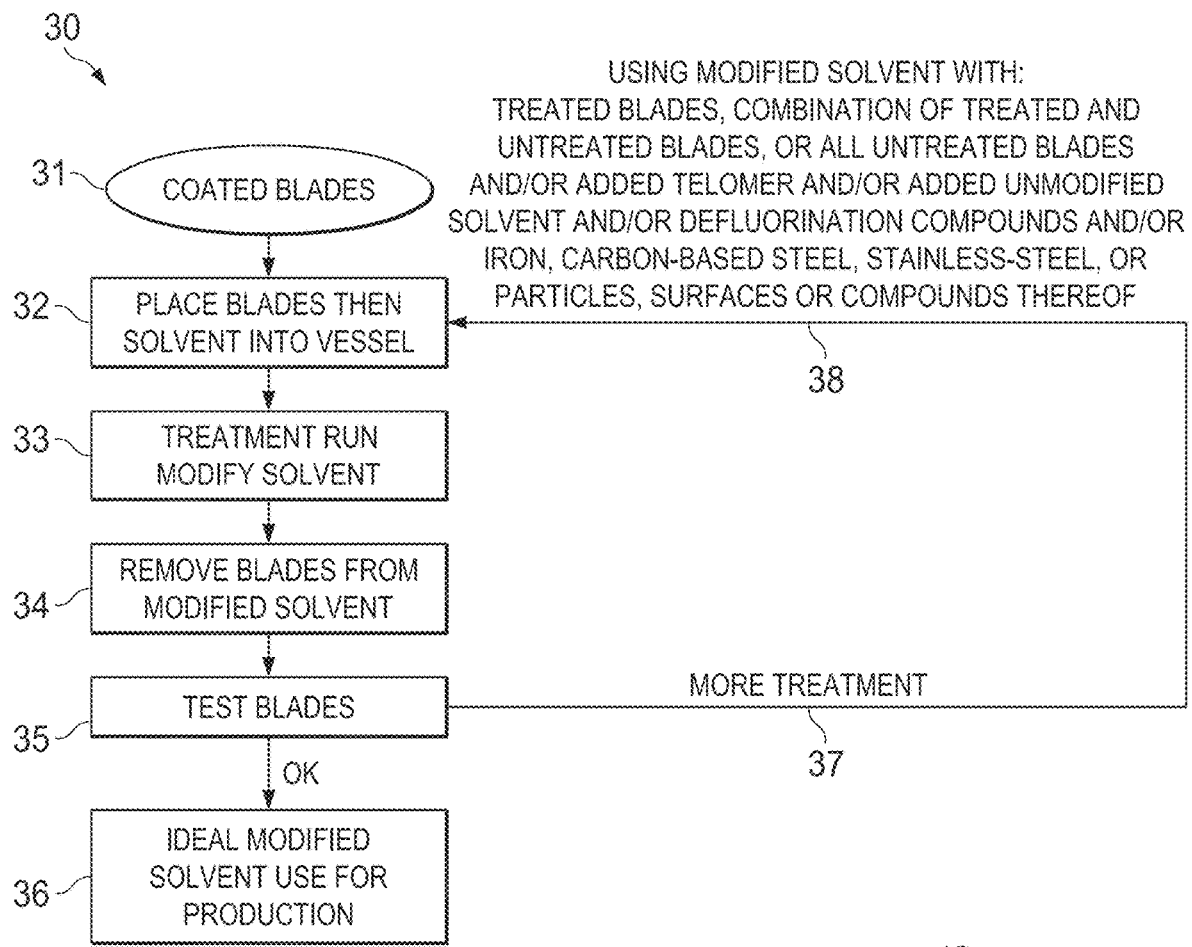
FIG. 3 is a flow diagram of the novel process of the present invention.

As shown in FIG. 2, a schematic of the novel process 20 of the present invention is provided. FIG. 3 shows a complementary flow diagram 30 of the novel process of the present invention. There are several razor blade stacks 22 in FIG. 2 which each include individual razor blades 22a, as shown in close-up view of FIG. 2A. Initially, these blades are disposed in a container 24. Some blade stacks 22 of the present invention may have up to 5000 blades disposed adjacent to each other. There may be from one to about 50 or more blade stacks prepared for processing in the present invention. These prepared blades are desirably coated with a soft, lubricous layer of a polymer, preferably a polyfluorocarbon, such as telomer or polytetrafluoroethylene or PTFE. Coated blades are indicated at step 31 of flow diagram 30 in FIG. 3. The coating process may have occurred by spraying, or by spraying and sintering, though any feasible application of this coating on the blade edges is contemplated in the present invention. For instance, it may be deposited initially by any method, including but not limited to, dipping, spin coating, sputtering, or thermal Chemical Vapor Deposition (CVD).

One or more of the prepared razor blade stacks 22 with a plurality of coated blades 22a are placed into a vessel 26. A solvent 25 is then placed into the vessel 26. This is also indicated in flow step 32 of FIG. 3. The types of solvents that can be used for this process can be selected based on polyfluorocarbon solvency, dissolution temperature, polarity and other parameters, for instance, as disclosed in U.S. Pat. No. 5,985,459.

Figure 4:
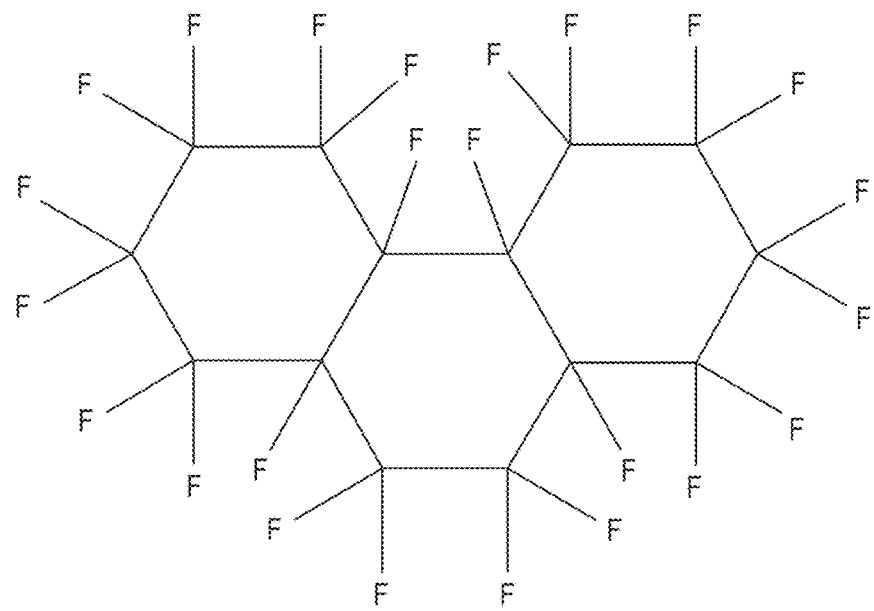
FIG. 4 is a chemical structure of an exemplary solvent of the present invention.

A preferred formula of the present invention solvent is $C_{14}F_{24}$. Any structure with this formula is contemplated in the present invention. One exemplary compound structure 42 of the $C_{14}F_{24}$ solvent of the present invention is shown in FIG. 4. One preferred solvent of the present invention is a perfluorotetradecahydrophenanthrene. A preferred brand name of a solvent for use in the present invention is FLUTEC®. A preferred type of FLUTEC® solvent is Flutec PP-11.

The Flutec solvent 25 in its original or unmodified state may be considered a "virgin" or a starting state solvent in that it is the solvent as received from the supplier. This original Flutec solvent is then heated to a temperature to thin and/or dissolve the polymer coating on the blade edge. In the present invention, a preferable temperature to heat the solvent ranges from about 500 degrees to about 700 degrees Fahrenheit, and preferably about 618 degrees Fahrenheit. The blades are preferably disposed in the heated solvent, desirably in a sealed vessel 26, for a time ranging from about 30 seconds to about 1 hour, and preferably for a time of about 90 seconds. To remove the blades from the vessel, the solvent may desirably be evacuated from the vessel and the blades may desirably be cooled.

The term "run" as used in the present invention, preferably includes, but is not limited to, the steps of placing the blades in a vessel, sealing the vessel, placing the solvent in the vessel, heating the vessel in order to heat the solvent for a certain amount of time, removing the modified solvent, cooling the blades, and removing the blades for testing. In alternate embodiments of the present invention a "run" may not include all the steps above, or a run may include a different order of steps.

Under these conditions, the blades are treated, (e.g., at step 33 of FIG. 3) such that there is a partial removal of the PTFE coating from the blade edges. As mentioned, this removal is generally desirable to reduce, dissolve, or thin the coating on the blade edge. Accordingly, the coated razor blade edges have been modified and these modified blades 22a' are referenced in FIG. 2. In addition, the Flutec solvent 25 has also been modified, now solvent 25' in FIG. 2, as it now includes at least portions or particles of the removed blade edge coating, and in particular the Teflon or PTFE coating.

The PTFE portions or particles will desirably be dissolved in the Flutec solution. This modified Flutec solvent 25' is indicated in FIG. 2 for example.

In accordance with a novel aspect of the preferred embodiment of the present invention, and as shown in FIGS. 2 and 3 by arrows 27 and 37, respectively, this modified Flutec solution 25' will be reused one or more times. The modified solvent 25' will preferably be reused with none of, a portion of, or all of the modified blades 22a' on the blade stack 22.

Blades will be treated and/or re-treated in the modified Flutec solvent. The present invention contemplates several "blade" scenarios for re-treatment in the modified solvent. In some instances, as indicated at step 38 of FIG. 3, it may be desirable to keep treating the same blades (e.g., same blade stack). In others, as indicated at step 38 of FIG. 3, it may be desirable, after one or more runs, to remove the modified blade stack and replace it with a new blade stack of blades coated with telomer (e.g., freshly sprayed blades and/or freshly sprayed and sintered). Further still, as indicated at step 38 of FIG. 3, it may be desirable to have a combination of freshly sprayed blades and/or freshly sprayed and sintered blades which have not yet been treated with the solvent along with blades that have been treated (e.g., blades that are on the stack that have undergone one or more treatments) and thus, are considered modified blades having had PTFE removal. Further still, as indicated in FIG. 2, PTFE or other polymers 28 and/or original Flutec solvent 29, may be added directly into the Flutec solvent. Thus, as shown in FIG. 2 or 3, polymers 28, original Flutec solvent 29, iron, carbon-based steel, stainless-steel, or particles, surfaces or compounds thereof 21, and/or one or more defluorination compounds 23 may be added in any amounts and at any time during any one of the process steps described herein including right at the outset into solvent 25. This aspect of adding polymer or PTFE 28 and original Flutec solvent 29 and these other compounds is also shown in FIG. 3 at step 38 flowing from arrow 37.

With each subsequent solvent treatment or run (e.g., use and reuse of the modified Flutec solution) more and more portions of the remaining PTFE coating from the blade edges were removed. This again modifies the coated razor blade edges (e.g., thinner coating) and again modifies the Flutec solution (e.g., additional particles of the removed blade edge coating are dissolved in the modified Flutec solution).

As the solvent solution is modified, the color of the solvent unexpectedly changes. The color is different from the color of the original Flutec. The color changes from a clear and untinted (e.g., water like) color when the solvent is in its original or "virgin" state, to a range of pale yellow (e.g., urine-like) color to yellow color when the solvent is in its ideal modified state. In some cases, the solvent is a yellow-brown color.

After one or several runs, blade attributes may be tested. This occurs for instance at testing step 35 of FIG. 3. One known blade attribute is sharpness. As noted above, measuring cutting force correlates with sharpness. The blade sharpness of the treated blades may be quantified by testing the blades for cutting force. Cutting force is measured by the wool felt cutter test, which measures the cutting force values of the blade by measuring the force required by each blade to cut through wool felt. Each blade is run through a wool felt cutter 5 times and the force of each cut (e.g., in pounds) is measured on a recorder. The lowest of 5 cuts is defined as the cutting force. In the present invention, wool felt cutter tests are preferably performed on the blades or a sample of the blades after each treatment or run.

Other known tests such as silicon oil drop tests and microscopy elevation evaluations are also contemplated in the present invention for determining blade attributes.

It was not clearly understood or obvious that a reuse of a solution that has a quantity of Teflon or PTFE dissolved or otherwise present in it would provide an effective solvent.

The modified Flutec solution of the present invention is also surprisingly comprised of one or more defluorination compounds which will be discussed below in more detail. These one or more defluorination compounds may be in a homogeneous solution with the Flutec solvent. The modified Flutec solution may also be comprised of iron, carbon-based steel, stainless-steel, or particles, surfaces or compounds thereof (e.g., iron compounds $Fe_2O_3$). These latter elements, particles, compounds or surfaces may be originating from the razor blades or the vessel if the vessel is comprised of steel. For instance, the presence of iron may be a catalyst producing the beneficial one or more defluorination compounds when the iron is in contact with the Flutec solution (whether modified solution or not). The modified Flutec solution is also preferably comprised of a yellow color.

These novel aspects of the modified Flutec solution will be discussed below.

Further, it is contemplated in the present invention that the Flutec solvent 25 (original Flutec solvent) can be doped with solid particles of polyfluorocarbon, such as Teflon or PTFE.

It is also contemplated in the present invention that the Flutec solvent 25 (original Flutec solvent) can be doped with one or more defluorination compounds.

It is also contemplated in the present invention that the Flutec solvent 25 (original Flutec solvent) can be doped with iron, carbon-based steel, stainless-steel, or particles, surfaces or compounds thereof (e.g., iron compounds $Fe_2O_3$).

Figure 9:
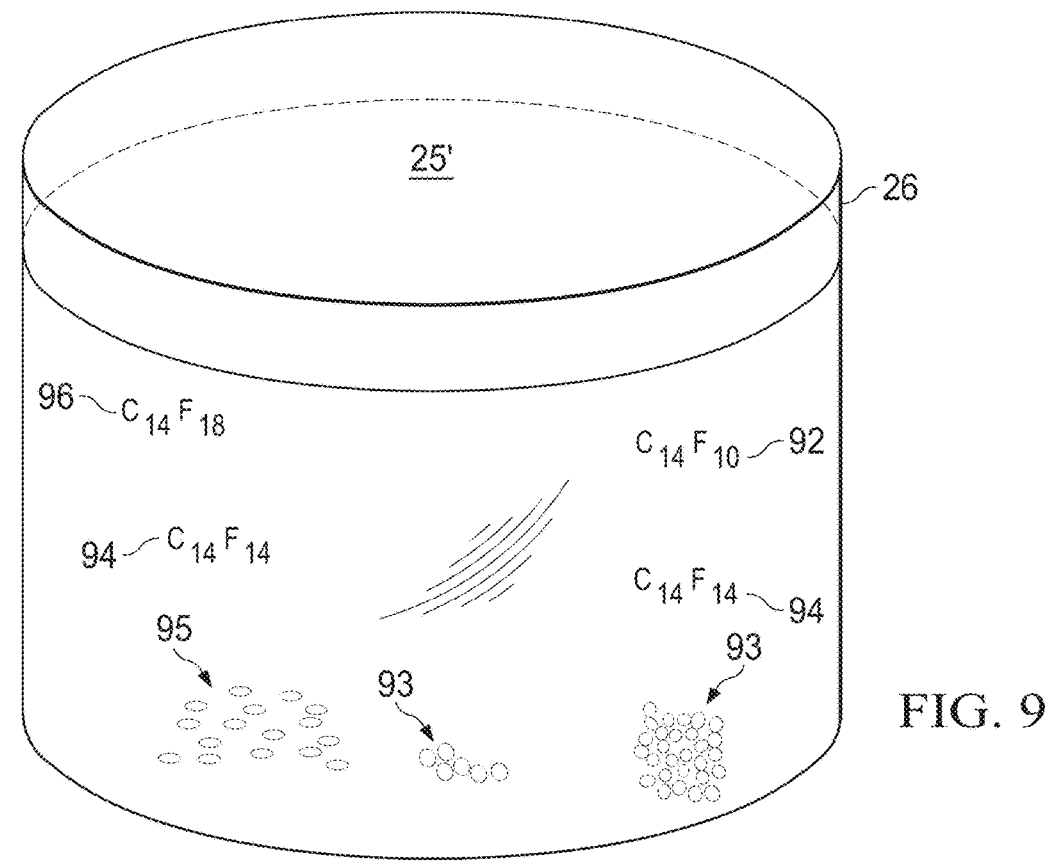
FIG. 9 is an illustration depicting the novel solvent of the present invention.

An illustration depicting a vessel 26 comprising the preferred ideal modified Flutec solution 25' of the present invention comprising defluorination compounds, PTFE portions or particles, and with iron, carbon-based steel, stainless-steel, or particles, surfaces or compounds thereof (e.g., iron compounds $Fe_2O_3$), is shown in FIG. 9. Though not shown, the ideal modified solution 25' may only include one or more defluorination compounds or only PTFE or only iron, carbon-based steel, stainless-steel, or particles, surfaces or compounds thereof, or any combination thereof.

It was also not recognized that the reuse of a solvent would modify it in such a way that new structures would be provided, such as the defluorination compounds or iron or iron compounds, to name a few of those described herein, and that these structures or particles would provide an effective solvent.

In the present invention, preferably several treatments or runs (e.g., modifications of the blades and solvent) in the modified solvent are required to obtain desirable blades (e.g., wool felt cut force values in the range of about 0.7 lbs to about 1.4 lbs for 5 cuts on a final set of blades). Once blades with acceptable attributes are produced, the reuse of there is no need to further treat the solvent. The solution that produces those desirable blades is considered to comprise an ideal modified solvent. This solution can be desirably used for blade production on a much larger scale as indicated at step 36 in FIG. 3.

In the present invention, the number of runs to obtain a desirable wool felt cut force on the blades and hence, a desirable solution or the ideal modified solvent, can range from one up to about 100 runs.

Figure 8:
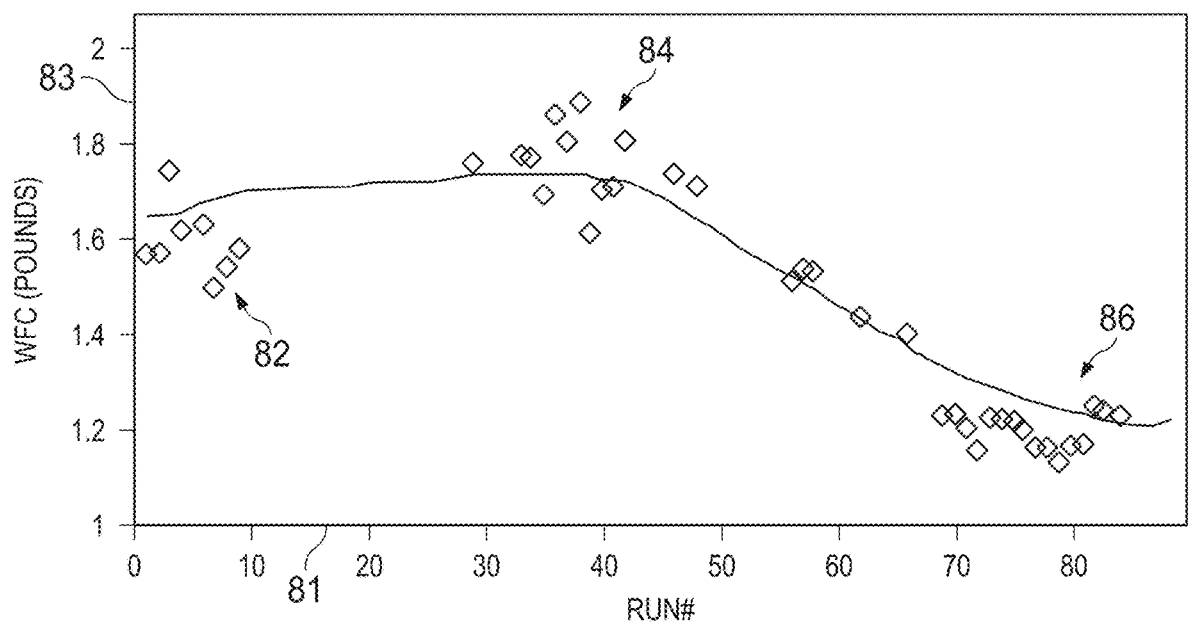
FIG. 8 is a graph of the wool felt cutter force values distribution versus the number of runs of the present invention.

Turning to FIG. 8, a distribution of wool felt cut force values over the course of many runs of the present invention process to produce the novel solvent is shown in chart 80. This chart 80 depicts the number of "runs" 81 or the number of times the blades were treated and modified in the solvent as related to wool felt cut force values 83. It can be seen from the chart, that after several initial runs, the wool felt cut force values in area 82 of the chart 80 are generally about 1.6 pounds (lbs.), which are generally not desirable cutting force values. After about 35-45 runs or treatments, the wool felt cut force values shown in area 84 unexpectedly and undesirably increase, generally ranging from about 1.6 lbs to about 1.8 lbs. It can be seen in FIG. 8 at chart area 86, that effectively almost about 80 "runs" were necessary to obtain and maintain the desired wool felt cut force values (e.g., about 1.2 lbs.) on the blades. While 80 runs are shown in this chart, in other instances, it may be that less than 80 runs are required to achieve desired wool felt cut values on the blades or it may that more than 80 runs are required to achieve desired wool felt cut values on the blades.

Accordingly, referring back to flow process 30 in FIG. 3, it should be noted that at the point when desirable cut force values are obtained after testing step 35, a final set of blades are removed from the vessel 16 so that the solvent itself can be kept and utilized at step 36 with new batches of blades from container 24 (e.g., production).

Defluorination Compounds

As described herein, the present invention original solvent is preferably comprised of a compound having the molecular formula $C_{14}F_{24}$ with an exemplary structure 42 shown in FIG. 4, though other stereoisomers and structural isomers of this formula are contemplated in the present invention.

As also described herein, the modified solvent of the present invention is desirably comprised of one or more defluorination compounds. These compounds are obtained in the solvent after one or more iterations or "runs" of treatment, preferably 1 to about 100 iterations or "runs" of treatment, more preferably 30 to 90 iterations and most preferably about 50 to 60 iterations.

The present invention one or more defluorination compounds comprise the molecular formula $C_{14}F_n$ where the variable "n" has a value ranging from 10 to 23. In a preferred embodiment of the present invention, exemplary defluorination compounds have the values for n equal to 10, 14, and 18. The preferred defluorination compounds are comprised of one or more of each of the following formulas, $C_{14}F_{10}$, $C_{14}F_{14}$, or $C_{14}F_{18}$, or any combination thereof. In an alternate preferred embodiment of the present invention, there is only one defluorination compound comprising the molecular formula $C_{14}F_n$ where the variable "n" has a value ranging from 10 to 23.

Figure 5:
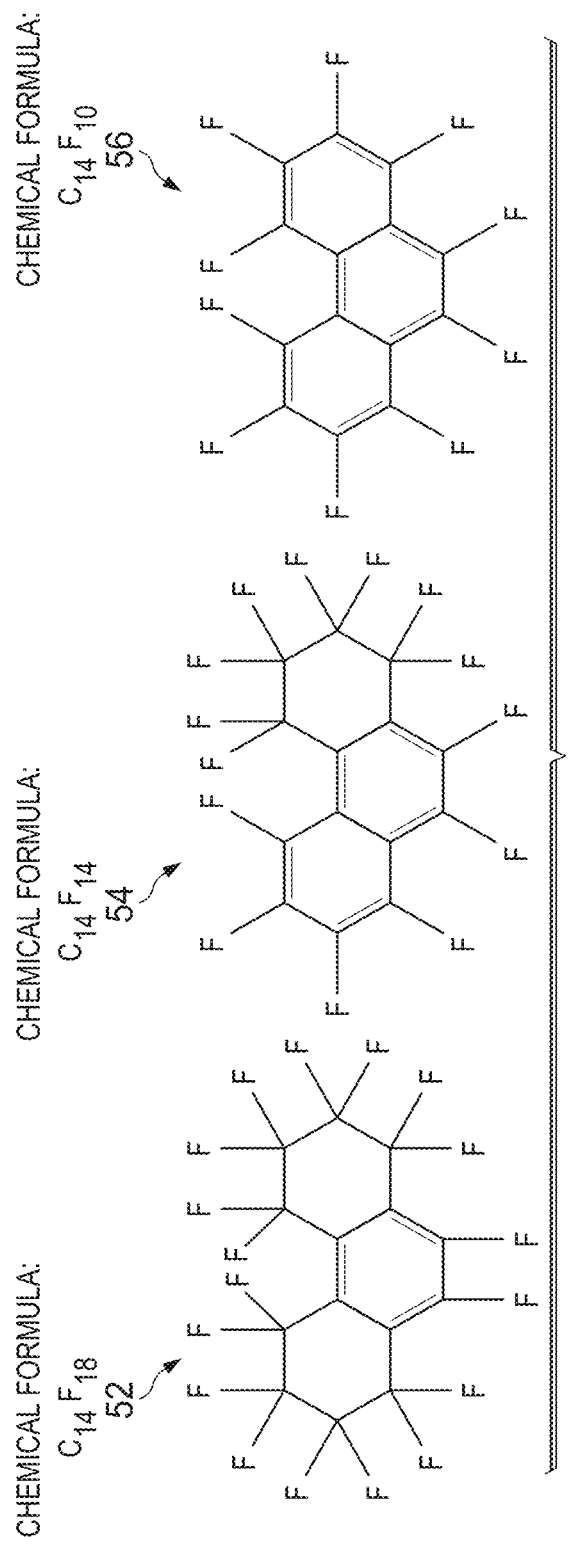
FIG. 5 depicts chemical structures of defluorination compounds of the present invention.

Exemplary defluorination compound structures of the present invention for the molecular formulas of $C_{14}F_{18}$, $C_{14}F_{14}$, and $C_{14}F_{10}$ are shown in FIG. 5 as structure 52, structure 54, and structure 56, respectively, though, for each, other stereoisomers and structural isomers of these structures are contemplated in the present invention.

If all these compound structures are observed in the modified solvent, they may represent the defluorination of, or the loss of, 6, 10, and 14 fluorine atoms from the original solvent. The compounds may be present at relative concentrations.

Any one of the one or more defluorination compounds in the solvent is less than or equal to about one part per million by weight of composition of the total solvent.

A concentration of the $C_{14}F_{18}$ compound in the modified solvent is in the range of about 0.05% to about 1.0%, and preferably about 0.7%. A concentration of the $C_{14}F_{14}$ compound in the modified solvent is in the range of about 0.05% to about 1.0%, and preferably about 0.4%. A concentration of the $C_{14}F_{10}$ compound in the modified solvent is in the range of about 0.05% to about 1.0%, and preferably about 0.1%. If more than one type of defluorination compound is present, the compounds may each be at about the same concentration levels in the modified solvent or at different levels. For instance, in one embodiment, the concentration of the $C_{14}F_{18}$ compound may be a larger concentration than the concentration of the $C_{14}F_{14}$ compound, and both these former concentrations may be larger than the concentration of the $C_{14}F_{10}$ compound in the modified solvent.

Figure 6:
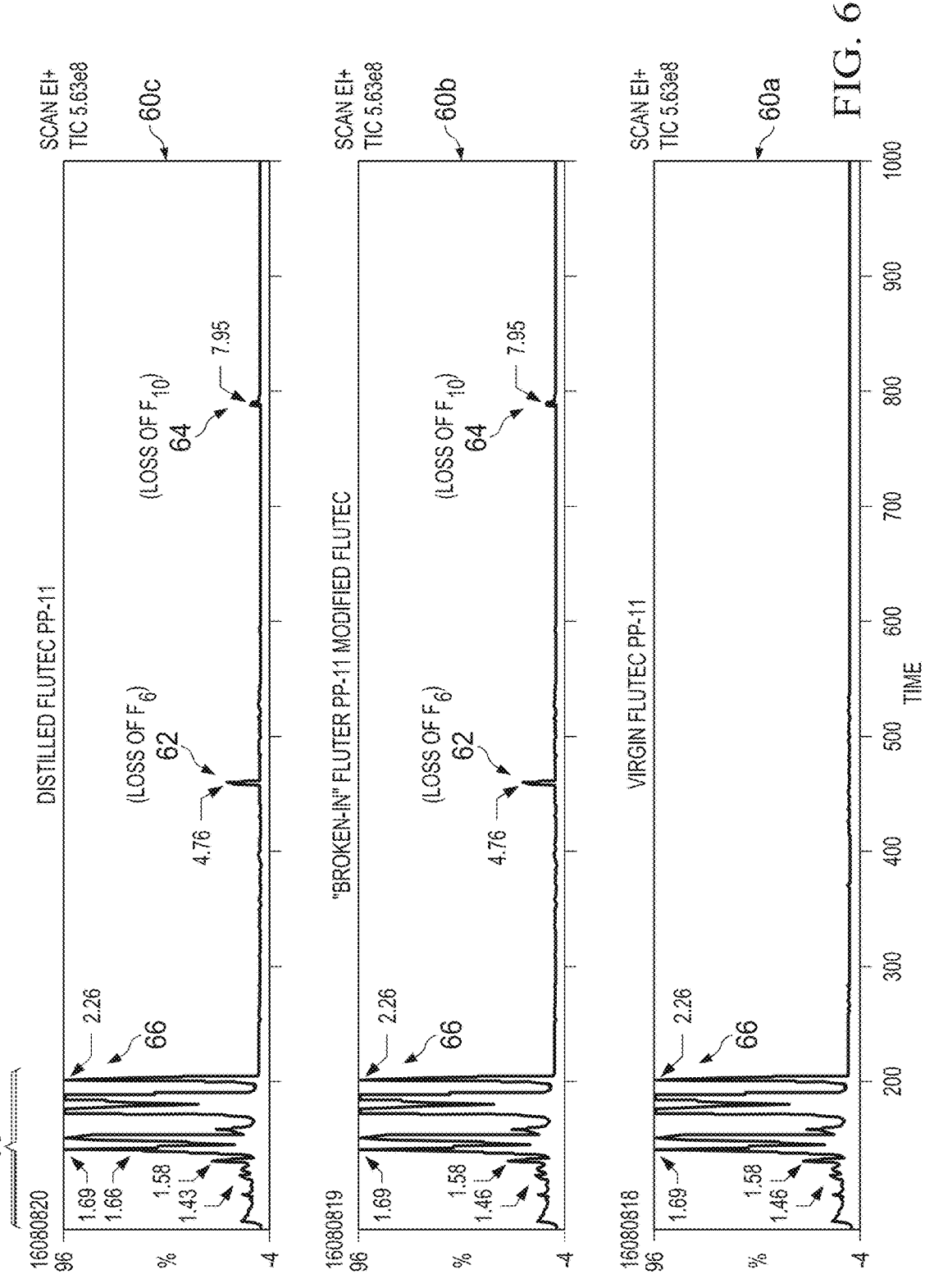
FIG. 6 depicts chromatographic overlay spectrums showing the presence of the compounds of the present invention.

FIG. 6 depicts chromatographic overlay spectrums 60b and 60c representing modified Flutec solution and a distilled Flutec solution, respectively, both showing the presence of the defluorination compounds of formulas $C_{14}F_{18}$ and $C_{14}F_{14}$ depicted at peak 62 and peak 64, respectively, of the present invention solvent, whether in distilled solvent or modified (e.g., broken-in) solvent. Also depicted in FIG. 6 are peaks 66 for the original solvent $C_{14}F_{24}$. It is noted that, in spectrum 60a, which represents the original unmodified Flutec solution, there are there are no peaks present besides peaks 66 which represent the original solvent, and hence it is recognized that no defluorination compounds are present in the original solvent.

Figure 7:
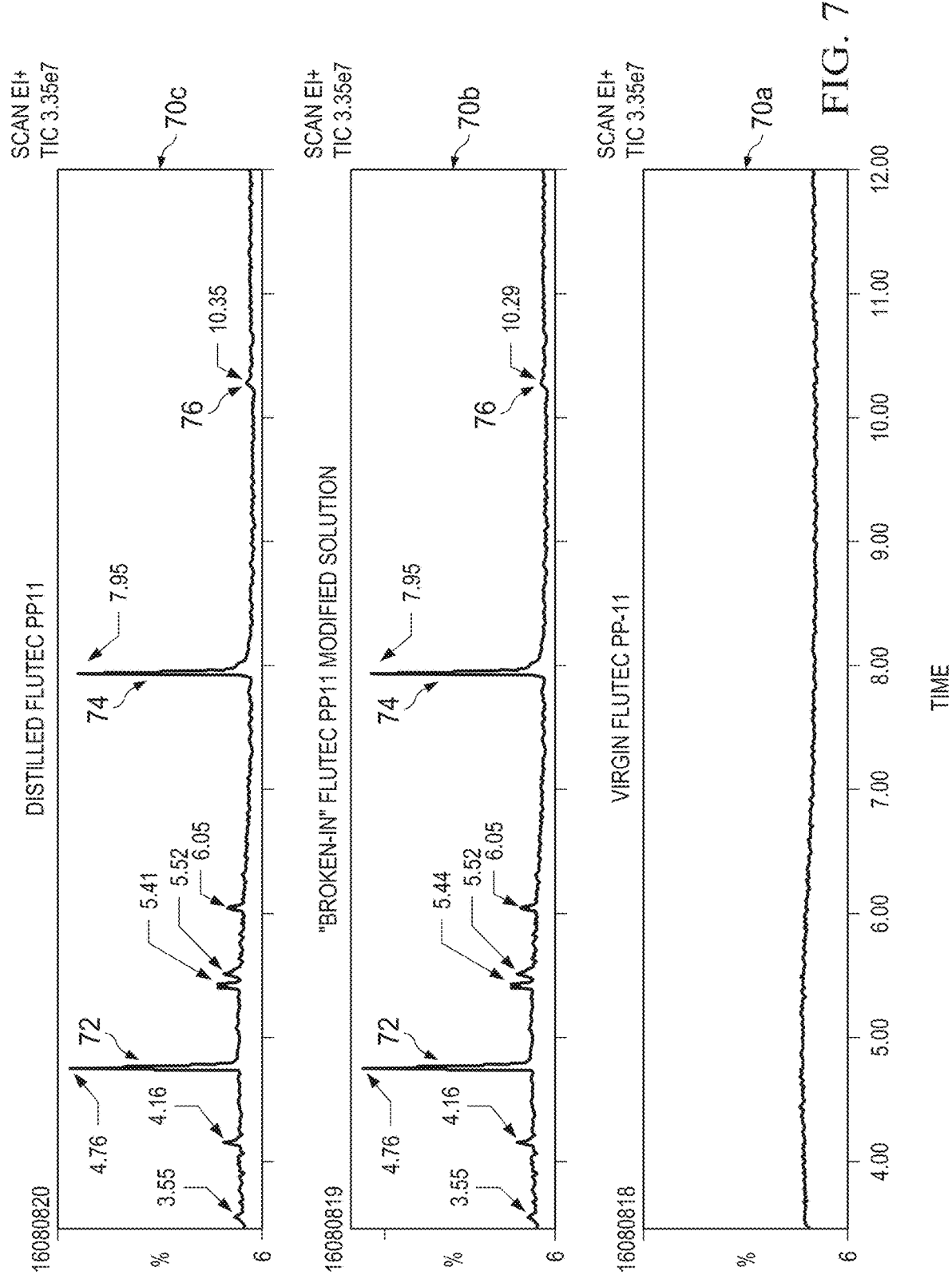
FIG. 7 depicts expanded chromatographic overlay spectrums showing the presence of the compounds of the present invention.

FIG. 7 shows chromatographic overlay spectrums 70b and 70c representing modified Flutec solvent and a distilled Flutec solvent, respectively, both showing the presence of the defluorination compounds of $C_{14}F_{18}$, $C_{14}F_{14}$, and $C_{14}F_{10}$ depicted at peak 72, peak 74, and peak 76, respectively, of the present invention solvent. It is noted that there are no such peaks present, and hence no defluorination compounds, in spectrum 70a also shown in FIG. 7 and which represents the original, "virgin" or unmodified Flutec solvent.

FIG. 9 depicts vessel 26 with modified Flutec solution 25' in a novel state. In its ideal modified state, the Flutec solution of the present invention comprises one or more defluorination compounds 92, 94, and 96 as shown in FIG. 9. As described, the concentration of each type of compound ranges from about 0.05% to about 1.0%.

In another embodiment, the ideal modified Flutec solution of the present invention comprises a concentration of Teflon particles or PTFE 93 as shown in FIG. 9. The concentration of Teflon or PTFE particles may range from about 50 ppm to about 1000 ppm.

In yet another embodiment, the ideal modified Flutec solution comprises a concentration of iron, carbon-based steel, stainless-steel, or particles, surfaces or compounds thereof 95 as shown in the illustration in FIG. 9. The concentration of these particles may range from about 5 ppm to about 1000 ppm.

Figure 10:
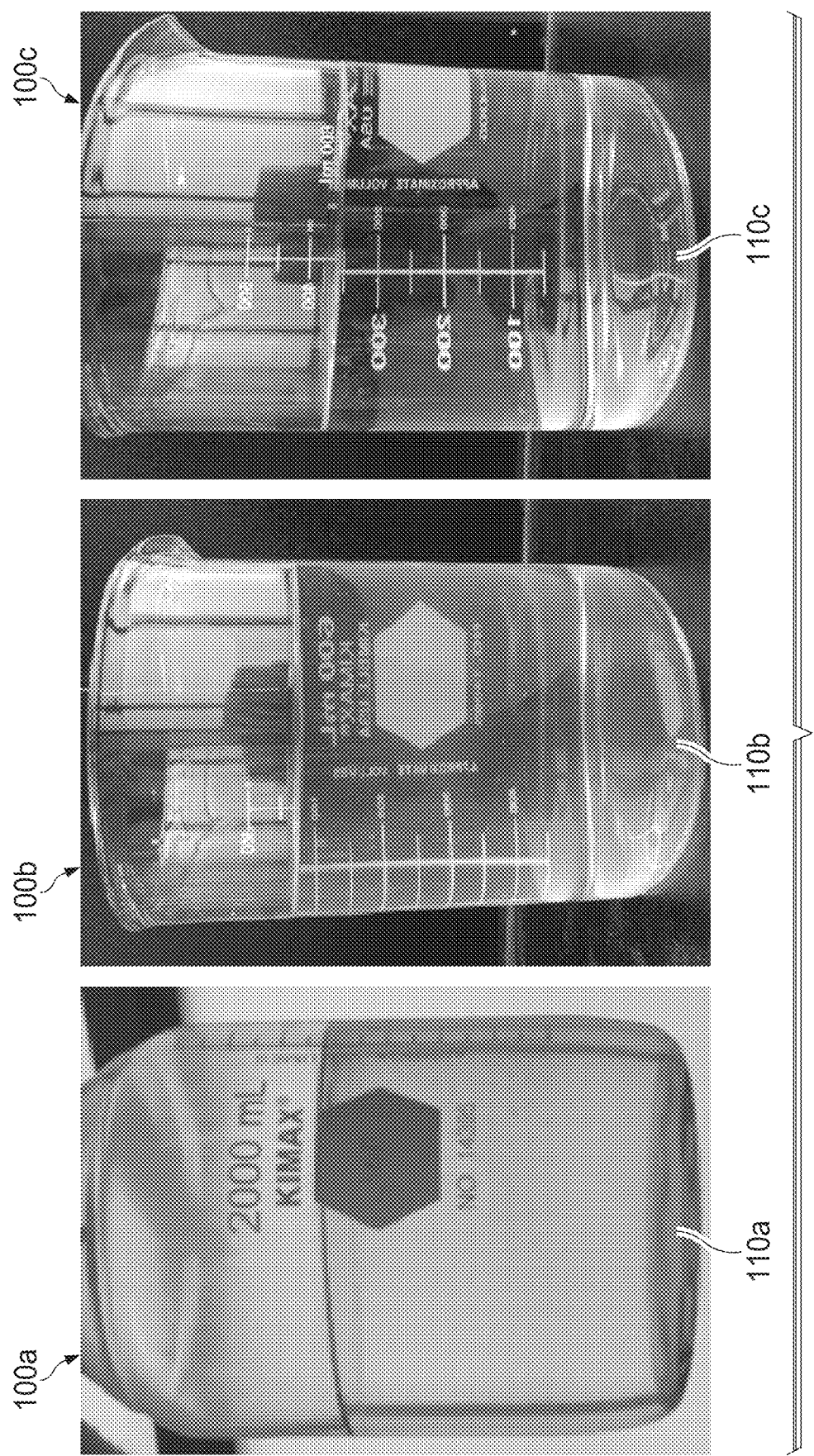
FIG. 10 are photos of samples of the novel solvent of the present invention.

In still another embodiment, the modified Flutec solution of the present invention comprises a yellow color. In FIG. 10, photos of several samples 100a, 100b, 100c of the modified Flutec solution of the present invention, are shown, each having a yellow color 110a, 110b, 110c, respectively. It can be seen that yellow color 110c is a lighter tone than the yellow colors 110a and 110b of samples 100a and 100b, respectively.

In a preferred embodiment, the ideal Flutec solution of the present invention comprises one or more of the following: one or more defluorination compounds, a concentration of Teflon particles ranging from about 50 ppm to about 1000 ppm, a concentration of iron, carbon-based steel, stainless-steel, or particles, surfaces or compounds thereof from about 5 ppm to about 1000 ppm, a yellow color, or any combination thereof.

Additionally, different dispersions or other forms of raw materials from various vendors may be readily used to achieve thin and uniform coatings.

The present invention contemplates applicability with other fluoropolymers in addition to PTFE, including but not limited to PFA (perfluoroalkoxy polymer resin), FEP (fluorinated ethylene-propylene), ETFE (polyethylenetetrafluoroethylene), PVF (polyvinylfluoride), PVDF (polyvinylidene fluoride), and ECTFE (polyethylenechlorotrifluoroethylene).

The present invention contemplates applicability with fluoropolymer (e.g., PTFE) composites, including, but not limited to PTFE/nanodiamond, PTFE/silica, PTFE/alumina, PTFE/silicone, PTFE/PEEK (polyetheretherketone), and PTFE/PFA.

Furthermore, the process of the present invention is not necessarily constrained to being applied to PTFE or PTFE type materials and may also be applicable to other non-fluoropolymer (e.g., non-PTFE) coating materials, including, for instance, but not limited to, polyvinylpyrorridone (PVP), polyethylene, polypropylene, ultrahigh molecular weight polyethylene, polymethyl methacrylate, parylene and/or others.

Additionally, the razor blade substrate may be comprised of steel with or without top layer coatings such as Chromium (Cr), Diamond-like Carbon (DLC), Amorphous Diamond, Chromium/Platinum (Cr/Pt) or other suitable materials or combination of materials.

In another embodiment of the present invention it is contemplated that the blades may be used in conjunction with a dry shaver in addition to a wet shaver where the cutter blades of the dry shaver are similarly produced as described herein.

It is further contemplated in yet another embodiment of the present invention that the present invention described above may be used in conjunction with blades that are implemented in medical or surgical instruments, such as surgical blades, scalpels, knives, forceps, scissors, shears, or the like or other non-surgical blades or cutting instruments.

Examples/Combinations

A. A method of treating one or more polyfluorocarbon coated razor blades comprising:

contacting at least one polyfluorocarbon coated razor blade with a solution of $C_{14}F_{24}$ comprising one or more defluorination compounds.

B. The method according to Paragraph A, wherein said one or more compounds comprise $C_{14}F_n$.

C. The method according to Paragraph A or B wherein n=10 to 23.

D. The method according to any one of paragraphs A to C wherein said one or more compounds comprise one or more of the following compounds: $C_{14}F_{10}$, $C_{14}F_{14}$, or $C_{14}F_{18}$ or any combination thereof.

E. The method according to any one of paragraphs A to D wherein a concentration of any one of the compounds in the solution is less than or equal to about one part per million.

F. The method according to any one of the preceding paragraphs wherein the concentration of said $C_{14}F_{18}$ compound in said solvent is about 0.05% to about 1.0%, the concentration of said $C_{14}F_{14}$ compound in said solvent is about 0.05% to about 1.0%, and the concentration of said $C_{14}F_{10}$ compound in said solvent is about 0.05% to about 1.0%.

G. The method according to any one of the preceding paragraphs wherein the concentration of said one or more compounds of $C_{14}F_n$ ranges from about 0.05% to about 3%.

H. The method according to any one of the preceding paragraphs wherein said step of contacting is repeated up to about 100 times.

I. The method according to any one of the preceding paragraphs wherein the solution comprises perfluoroperhydrophenanthrene.

J. The method according to any one of the preceding paragraphs wherein said contacting step is applied for a time ranging from about 30 seconds to about 1 hour.

K. The method according to any one of the preceding paragraphs wherein said contacting step is at a temperature range of about 500° F. to about 700° F.

L. The method according to any one of the preceding paragraphs wherein said contacting step is applied to said coating after said polyfluorocarbon coating has been sprayed, sintered or any combination thereof.

M. The method according to any one of the preceding paragraphs further comprising the step of removing, none of, portions of, or all of the contacted coated blade edges from said solution of $C_{14}F_{24}$ comprising one or more defluorination compounds.

N. The method according to any one of the preceding paragraphs further comprising the step of providing uncontacted coated razor blade edges in said solution of $C_{14}F_{24}$ solvent comprising one or more defluorination compounds.

O. The method according to any one of the preceding paragraphs wherein said contact step further comprises placing the blades in a vessel, sealing the vessel, placing the solution in the vessel, heating the vessel, removing the solvent, and cooling the blades.

P. The method according to any one of the preceding paragraphs wherein said contacting step partially removes said coating of said coated razor blades.

Q. The method according to any one of the preceding paragraphs wherein said solution of $C_{14}F_{24}$ comprising one or more defluorination compounds further comprises PTFE.

R. The method according to any one of the preceding paragraphs, wherein said solution of $C_{14}F_{24}$ comprising one or more defluorination compounds further comprises iron, carbon-based steel, stainless-steel, or particles, surfaces or compounds thereof.

S. The method according to any one of the preceding paragraphs, wherein said solution of $C_{14}F_{24}$ comprising one or more defluorination compounds further comprises a yellow color.

T. A solution for treating one or more coated razor blades comprising a yellow color.

U. A method of treating one or more polyfluorocarbon coated razor blades comprising: contacting at least one polyfluorocarbon coated razor blade with a solution comprising one or more defluorination compounds.

V. The method according to Paragraph U wherein said solution is $C_{14}F_{24}$.

W. The method according to Paragraph U or V wherein said one or more defluorination compounds comprise $C_{14}F_n$ wherein n=10 to 23.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of treating razor blade coatings comprising the steps of:
   (a) providing a vessel;
   (b) providing a plurality of razor blades in said vessel;
   (c) sealing said vessel;
   (d) placing a solvent in said vessel, wherein said solvent comprises one or more defluorination compounds comprising $C_{14}F_{10}$, $C_{14}F_{14}$, or $C_{14}F_{18}$, or any combination thereof;
   (e) heating said vessel to form a heated solution;
   (f) contacting a portion of said plurality of razor blades with said heated solution;
   (g) removing said heated solution; and
   (h) cooling said plurality of razor blades, wherein removing said heated solution occurs before cooling said plurality of blades.

2. The method of claim 1 wherein said step (b) occurs before step (c).

3. The method of claim 1 wherein said solvent comprises a solution of $C_{14}F_{24}$.

4. The method of claim 1 wherein said plurality of razor blades comprise polyfluorocarbon coatings.

5. The method of claim 4 wherein said contacting step (f) contacts said polyfluorocarbon coatings.

6. The method of claim 1 wherein said contacting step (f) contacts a plurality of cutting edges of said plurality of razor blades.

7. The method of claim 1 wherein a concentration of said $C_{14}F_{18}$ compound in said solvent is about 0.05% to about 1.0%, a concentration of said $C_{14}F_{14}$ compound in said solvent is about 0.05% to about 1.0%, and a concentration of said $C_{14}F_{10}$ compound in said solvent is about 0.05% to about 1.0%.

8. The method of claim 1 wherein a concentration of any one of said one or more defluorination compounds in the solution is less than or equal to about one part per million.

9. The method of claim 1 wherein a concentration of said one or more defluorination compounds ranges from about 0.05% to about 3%.

10. The method of claim 1 wherein said contacting step (f) is repeated up to about 100 times.

11. The method of claim 1 wherein said contacting step (f) ranges from about 30 seconds to one hour.

12. The method of claim 1 wherein said heating step (e) heats said solvent, heats said plurality of razor blades, or both.

13. The method of claim 1 wherein said heating step (e) comprises a temperature range from about 500 degrees to about 700 degrees Fahrenheit.

14. The method of claim 1 wherein said removing step (g) comprises evacuating said vessel of said heated solution.

15. The method of claim 1 wherein said plurality of razor blades comprise one or more stacks of razor blades, wherein said one or more stacks of blades comprises one to about 5000 blades.

16. The method of claim 15 wherein said one or more stacks are disposed in a container prior to step (b).

17. The method of claim 16 wherein said container is a cylindrical prism.

18. The method of claim 16 wherein said container comprises a ring.

19. The method of claim 1 further comprising repeating steps any of steps (b) through (h).

20. The method of claim 1 further comprising a step (i) of testing said cooled plurality of blades.

* * * * *